3,314,953
1-SUBSTITUTED-3-PHTHALIMIDO-2,5-DIOXOPYRROLIDINES

Aristotle J. Vazakas, Ambler, and Walter W. Bennetts, Jr., Richboro, Pa., assignors to Richardson-Merrell Inc., New York, N.Y., a corporation of Delaware
No Drawing. Filed Mar. 16, 1964, Ser. No. 352,324
17 Claims. (Cl. 260—247.2)

This invention relates to new compositions of matter which possess useful physiological properties and which are also useful as intermediates for the preparation of organic compounds.

The new compounds of the present invention are 1-substituted-3-phthalimido-2,5-dioxypyrrolidines and may be represented by the formula:

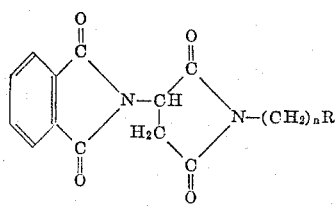

in which $n$ may be 0, 1, 2, or 3 and R may be alkoxy, dialkylamino, diaralkylamino, morpholino, pyrrolidino, 2-furanyl, phenyl or substituted phenyl, and benzhydryl. This invention also includes the addition salts of those compounds of the general formula which are able to form salts.

The new dioxopyrrolidines may be prepared by addition of a substituted primary amine to 2-phthalimidosuccinic anhydride (King and Kidd, J. Chem. Soc., 1951, 2976) followed by dehydration of the substituted succinamic acids which result as follows:

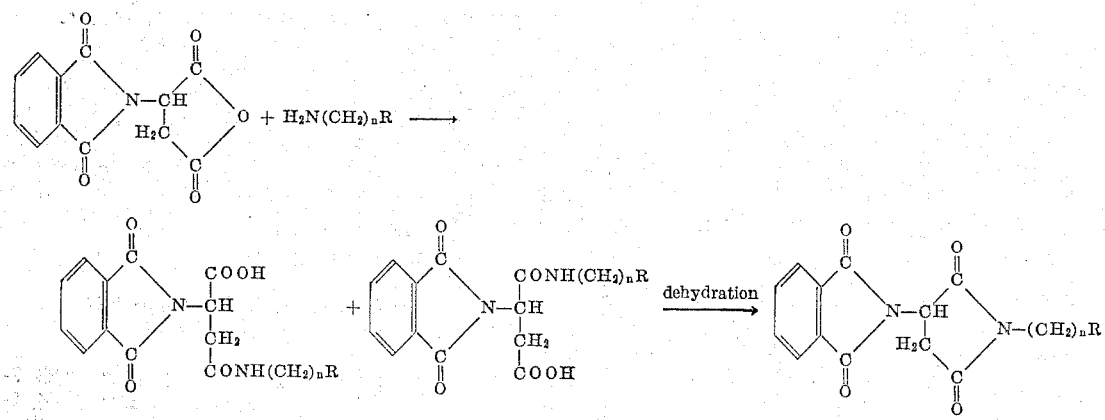

The substituted succinamic acids are prepared by addition of the substituted primary amine to the 2-phthalimidosuccinic anhydride in an inert solvent, such as dioxane, under anhydrous conditions and while cooling in ice. When addition is complete, the reaction mixture is allowed to warm to room temperature and, to insure complete reaction, the mixture is heated briefly to 70–100° C. Removal of the solvent yields a crude mixture of the substituted succinamic acids which, on dehydration, undergoes ring closure to the imide. Dehydration may be effected by (1) heating the crude succinamic acids to 150–190° C. without use of solvent, (2) refluxing the crude succinamic acids in acetic anhydride, or (3) removal of the water by azeotropic distillation of a toluene mixture of the succinamic acids, catalyzed by addition of several drops of a strong acid such as chlorosulfonic acid.

The compounds of the present invention have useful physiological properties such as central nervous system depressant activity similar to meprobamate, are weakly anti-inflammatory, have weak analgesic activity, and are anti-hypertensive.

EXAMPLE 1

*1-(3-methoxypropyl)-3-phthalimido-2,5-dioxopyrrolidine*

A solution of 10.0 grams (0.11 mole) of 3-methoxypropylamine in 100 milliliters of dioxane is added to a well cooled mixture of 24.5 grams (0.1 mole) of N-phthaloylaspartic anhydride in 500 milliliters of dioxane, heated on a steam bath gently until complete solution results, and allowed to stand at room temperature overnight. The reaction mixture is then filtered, the filtrate concentrated to dryness at reduced pressure, and the residual brown oil is washed by decantation with ether, thereby being converted into a tan semi-solid consisting mainly of the crude substituted succinamic acid. This semi-solid is mixed with 100 milliliters of acetic anhydride and the mixture is refluxed for one hour. The solvent is then removed by distillation at reduced pressure, the residual dark oil dissolved in ethyl acetate, and the ethyl acetate solution washed consecutively with water, dilute sodium carbonate solution, and water. The ethyl acetate solution is then dried (anhydrous sodium sulfate), filtered, and the filtrate poured into excess petroleum ether to precipitate the product, 1-(3-methoxypropyl)-3-phthalimido-2,5-dioxopyrrolidine, as a brown amorphous solid. After two recrystallizations of this solid from ethyl acetate (charcoal), there is obtained 11.7 grams of snow-white crystals, melting point 125.5° C. to 126.5° C. An additional 3.15 grams of pure product can be obtained from the mother liquor to give a total yield of 14.85 grams (47 percent).

EXAMPLE 2

*1-(2-methoxyethyl)-3-phthalimido-2,5-dioxopyrrolidine*

When 3-methoxypropylamine is replaced with 2-methoxyethylamine in the procedure of Example 1, 1-(2-methoxyethyl)-3 - phthalimido - 2,5 - dioxopyrrolidine is obtained as pale lemon colored crystals, melting at 139–140° C. (from ethyl acetate), in 56 percent yield.

EXAMPLE 3

*1-(3-ethoxypropyl)-3-phthalimido-2,5-dioxopyrrolidine*

When 3-methoxypropylamine is replaced with 3-ethoxy propylamine in the procedure of Example 1, 1-(3-ethoxypropyl)-3 - phthalimido - 2,5 - dioxopyrrolidine is obtained, crystallizing in clusters of small very white needles

EXAMPLE 4

*1-(3-diethylaminopropyl)-3-phthalimido-2,5-dioxopyrrolidine hydrochloride*

A solution of 7.3 grams (0.056 mole) of 3-diethylaminopropylamine in 50 milliliters of dioxane is added to a well cooled mixture of 12.25 grams (0.05 mole) of N-phthaloylaspartic anhydride in 250 milliliters of dioxane to cause an immediate precipitation of the substituted succinamic acid salt as a thick oil. The mixture is warmed briefly on a steam bath, and after being allowed to stand overnight, the precipitated oily product becomes partially crystalline. Addition of excess anhydrous ether and stirring converts the product into a white powder. The crude product is collected, mixed with 100 milliliters of acetic anhydride, and refluxed for one hour, the mixture quickly becoming an orange-brown solution. The solvent is then removed by distillation at reduced pressure and the residue dissolved in dilute hydrochloric acid. The aqueous solution is extracted well with ethyl acetate, then basified to pH 9 with a concentrated solution of sodium carbonate to liberate crude 1-(3-diethylaminopropyl)-3-phthalimido-2,5-dioxopyrrolidine as a dark oil. This oily product is extracted into ethyl acetate, the extract is dried (anhydrous sodium sulfate), filtered, and the filtrate concentrated to dryness. The residual oil is dissolved in anhydrous ether, filtered, and anhydrous hydrogen chloride is passed into the filtrate to precipitate 1-(3-diethylaminopropyl)-3-phthalimido - 2,5 - dioxopyrrolidine hydrochloride. The product is washed well with anhydrous ether by decantation, then recrystallized from methyl ethyl ketone to give 9.1 grams (46 percent) of light tan product, melting point 209–210° C.

EXAMPLE 5

*1-(3-dimethylaminopropyl)-3-phthalimido-2,5-dioxopyrrolidine hydrochloride*

When 3-diethylaminopropylamine is replaced with 3-dimethylaminopropylamine in the procedure of Example 4, 1 - (3-dimethylaminopropyl)-3-phthalimido-2,5-dioxopyrrolidine hydrochloride is obtained as a white crystalline solid, melting at 240–241° C. (from butanone-ethanol), in 43 percent yield.

EXAMPLE 6

*1-(3-morpholinopropyl)-3-phthalimido-2,5-dioxopyrrolidine hydrochloride*

When 3-diethylaminopropylamine is replaced with N-(3-aminopropyl) morpholine in the procedure of Example 4, 1 - (3 - morpholinopropyl)-3-phthalimido-2,5-dioxopyrrolidine hydrochloride is obtained as an off-white crystalline solid, melting at 281–282° C. with decomposition (from methanol) in 30 percent yield.

EXAMPLE 7

*1-(2-dibenzylaminoethyl)-3-phthalimido-2,5-dioxopyrrolidine hydrochloride*

When 3-diethylaminopropylamine is replaced with 2-dibenzylaminoethylamine in the procedure of Example 4, removal of the acetic anhydride by distillation at reduced pressure yields a grey solid mass. This mass is dissolved in chloroform, the chloroform solution is extracted with a dilute solution of sodium carbonate, dried, filtered, and the filtrate concentrated to dryness. The solid residue is dissolved in benzene and 1-(2-dibenzylaminoethyl)-3-phthalimido-2,5-dioxopyrrolidine hydrochloride is precipitated from the benzene solution by addition of anhydrous hydrogen chloride followed by addition of excess anhydrous ether. This product, when purified by recrystallization from butanone, melts at 205–208° C. with decomposition. The yield is 74 percent.

EXAMPLE 8

*1-(2-diethylaminoethyl)-3-phthalimido-2,5-dioxopyrrolidine hydrochloride*

When 3-diethylaminopropylamine is replaced with 2-diethylaminoethylamine in the procedure of Example 4, 1-(2-diethylaminoethyl)-3-phthalimido-2,5 - dioxopyrrolidine hydrochloride is obtained as a light tan crystalline solid, melting at 239° C. with decomposition (from butanone) in 45 percent yield.

EXAMPLE 9

*1-(2-diethylaminoethyl)-3-phthalimido-2,5-dioxopyrrolidine hydrochloride*

When 3-diethylaminopropylamine is replaced with 2-diethylaminoethylamine in the procedure of Example 4, if the substituted succinamic acid is heated without solvent to 165–185° C. for two hours rather than being refluxed in acetic anhydride, ring closure to the imide is also effected and 1-(2-diethylaminoethyl)-3-phthalimido-2,5-dioxopyrrolidine hydrochloride, melting point 239° C. with decomposition (from butanone) is obtained in 38 percent yield.

EXAMPLE 10

*1-(2-dimethylaminoethyl)-3-phthalimido-2,5-dioxopyrrolidine hydrochloride*

When 3-diethylaminopropylamine is replaced with N,N-dimethylethylenediamine in the procedure of Example 4, 1-(2-dimethylaminoethyl)-3-phthalimido-2,5 - dioxopyrrolidine hydrochloride is obtained as a light tan crystalline solid, melting point 278° C. with decomposition (from ethanol) in 25 percent yield.

EXAMPLE 11

*1-(2-diisopropylaminoethyl)-3-phthalimido-2,5-dioxopyrrolidine hydrochloride*

When 3-diethylaminopropylamine is replaced with N,N-diisopropylethylenediamine in the procedure of Example 4, 1-(2-diisopropylaminoethyl)-3-phthalimido-2,5-dioxopyrrolidine hydrochloride is obtained as a white solid, melting point 251° C. with decomposition (from methanol-isopropyl alcohol) in 48 percent yield.

EXAMPLE 12

*1-(2-pyrrolidinoethyl)-3-phthalimido-2,5-dioxopyrrolidine hydrochloride*

When 3-diethylaminopropylamine is replaced with 2-pyrrolidinoethylamine in the procedure of Example 4, 1-(2-pyrrolidinoethyl)-3-phthalimido-2,5 - dioxopyrrolidine hydrochloride is obtained as a white crystalline solid, melting point 287° C. with decomposition (from ethanol) in 66 percent yield.

EXAMPLE 13

*1-[2-(3,4-dimethoxyphenyl)ethyl]-3-phthalimido-2,5-dioxopyrrolidine*

When 3-methoxypropylamine is replaced with 2-(3,4-dimethoxyphenyl) ethylamine in the procedure of Example 1, 1-[2-(3,4-dimethoxyphenyl)ethyl]-3 - phthalimido-2,5-dioxopyrrolidine is obtained as a white crystalline solid, melting point 169–171° C. (from ethyl acetate) in 44 percent yield.

EXAMPLE 14

*1-furfuryl-3-phthalimido-2,5-dioxopyrrolidine*

When 3-methoxypropylamine is replaced with furfurylamine in the procedure of Example 1, 1-furfuryl-3-phthalimido-2,5-dioxopyrrolidine is obtained as light tan needles, melting point 151–152° C. (from ethanol) in 34 percent yield.

EXAMPLE 15

*1-(3,3-diphenylpropyl)-3-phthalimido-2,5-dioxopyrrolidine*

When 3-methoxypropylamine is replaced with 3,3-diphenylpropylamine in the procedure of Example 1, 1-(3,3-diphenylpropyl)-3-phthalimido-2,5-dioxopyrrolidine is obtained, crystallizing as off-white plates and melting at 157–159° C. (from isopropyl alcohol). The yield is 76 percent.

EXAMPLE 16

*1-(3,3-diphenylpropyl)-3-phthalimido-2,5-dioxopyrrolidine*

In the procedure of Example 15, azeotropic removal of water from the substituted succinamic acid, rather than the use of acetic anhydride, has been employed as an alternate means for the preparation of the desired imide. Hence, if the substituted succinamic acid is mixed with toluene, three drops of chlorosulfonic acid added, and the mixture refluxed using a Dean-Stark trap for collection of the water, the theoretical amount of water is collected after a reflux period of eight hours. Removal of the toluene and recrystallization of the residue affords 1-(3,3-diphenylpropyl)-3-phthalimido-2,5-dioxopyrrolidine as white needles melting at 157–159° C. (from ethanol). The yield is 43 percent.

EXAMPLE 17

*1-benzhydryl-3-phthalimido-2,5-dioxopyrrolidine*

When 3-methoxypyropylamine is replaced with benzhydrylamine in the procedure of Example 1, 1-benzhydryl-3-phthalimido-2,5-dioxopyrrolidine is obtained, crystallizing as a fluffy white solid and melting at 212–213° C. (from ethyl acetate). The yield is 25 percent.

EXAMPLE 18

*1-(2-ethoxyethyl)-3-phthalimido-2,5-dioxopyrrolidine*

When 3-methoxypropylamine is replaced with 2-ethoxyethylamine in the procedure of Example 1 and ring closure is effected through azeotropic removal of water from the substituted succinamic acid as in the procedure of Example 16, 1-(2-ethoxyethyl)-3-phthalimido-2,5-dioxopyrrolidine is obtained, crystallizing as a white solid and melting at 74–77° C. (from isopropyl alcohol) after prolonged drying at 50° C. The yield is 49 percent.

What is claimed is:
1. A compound of the formula:

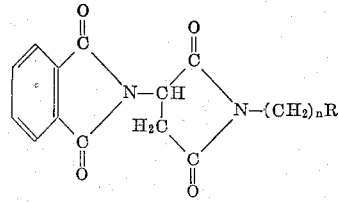

in which $n$ is a small whole number from 1 to 3, inclusive, and R is selected from the group consisting of lower alkoxy, diloweralkylamino, dibenzylamino, morpholino, pyrrolidino, diloweralkoxyphenyl, and benzhydryl.

2. The compound 1-(3-methoxypropyl)-3-phthalimido-2,5-dioxopyrrolidine.
3. The compound 1-(2-methoxyethyl)-3-phthalimido-2,5-dioxopyrrolidine.
4. The compound 1-(3-ethoxypropyl)-3-phthalimido-2,5-dioxopyrrolidine.
5. The compound 1-(3-diethylaminopropyl)-3-phthalimido-2,5-dioxopyrrolidine.
6. The compound 1-(3-dimethylaminopropyl)-3-phthalimido-2,5-dioxopyrrolidine.
7. The compound 1-(3-morpholinopropyl)-3-phthalimido-2,5-dioxopyrrolidine.
8. The compound 1-(2-dibenzylaminoethyl)-3-phthalimido-2,5-dioxopyrrolidine.
9. The compound 1-(2-diethylaminoethyl)-3-phthalimido-2,5-dioxopyrrolidine.
10. The compound 1-(2-dimethylaminoethyl)-3-phthalimido-2,5-dioxopyrrolidine.
11. The compound 1-(2-diisopropylaminoethyl)-3-phthalimido-2,5-dioxopyrrolidine.
12. The compound 1-(2-pyrrolidinoethyl)-3-phthalimido-2,5-dioxopyrrolidine.
13. The compound 1-[2-(3,4-dimethoxyphenyl)ethyl]-3-phthalimido-2,5-dioxopyrrolidine.
14. The compound 1-furfuryl-3-phthalimido-2,5-dioxopyrrolidine.
15. The compound 1-(3,3-diphenylpropyl)-3-phthalimido-2,5-dioxopyrrolidine.
16. The compound 1-benzhydryl-3-phthalimido-2,5-dioxopyrrolidine.
17. The compound 1-(2-ethoxyethyl)-3-phthalimido-2,5-dioxopyrrolidine.

References Cited by the Examiner

UNITED STATES PATENTS 3,200,118   8/1965   Grogan et al. _____ 260—281

OTHER REFERENCES

King et al.: J. Chemical Society, Part IV, pp. 2976–78 (1951).

ALEX MAZEL, *Primary Examiner.*

JOSE TOVAR, *Assistant Examiner.*